United States Patent Office 3,441,417
Patented Apr. 29, 1969

3,441,417
BEVERAGE PRODUCT AND PROCESS
Jacob R. Feldman and Valentine J. Fischer, New City, and Matthew Hameil, Orangeburg, N.Y., and Lewis M. Berkowitz, Baltimore, Md., assignors to General Foods Corporation, White Plains, N.Y., a corporation of Delaware
No Drawing. Continuation-in-part of application Ser. No. 247,311, Dec. 26, 1962. This application Oct. 5, 1965, Ser. No. 493,236
Int. Cl. A23l 1/00
U.S. Cl. 99—79       19 Claims

ABSTRACT OF THE DISCLOSURE

A dry beverage composition adapted to be reconstituted with an aqueous liquid to produce an effervescent beverage comprising, as an essential carbonating ingredient, an organic compound having a carbonic acid anhydride group, capable of controlled hydrolysis in water to release $CO_2$ at a substantially uniform rate. Buffers and other adjuncts may be provided for the composition which is adapted to produce a carbonated beverage of improved palatability and effervescence.

---

This application is a continuation-in-part of our co-pending application Ser. No. 247,311, filed Dec. 26, 1962, and now abandoned.

This invention pertains to the manufacture of novel dry beverage compositions and more particularly is concerned with the manufacture of carbonated beverages of improved palatability and effervescence.

The prior art has long sought a desirable dry beverage composition having an effervescene typical of bottled beverages. In the main, the art has concentrated on reacting an edible food acid, e.g., citric acid, and an inorganic carbonate, e.g., sodium bicarbonate, to form what is called an "effervescent couple" which gives off carbon dioxide on contact with water. The production of carbon dioxide gas as a result of this reaction is usually quite rapid and pronounced, any beverage composition containing such reagents producing an immediate evolution of carbon dioxide gas which is rapidly spent to the atmosphere above the reconstituted beverage. The beverage product after a period of one or two minutes possesses some mild degree of carbonation due to the solubility of the carbon dioxide in the beverage. However, $CO_2$ retention is usually much below saturation and is typically in the range of 0.7–1.0 volume per volume of water solution. At this range the characteristic carbonation sensation on ingestion is almost non-existent. Furthermore, a direct byproduct of the "effervescent couple" reaction is a metallic salt of the particular food acid used and it is this undesirable residue which imparts a characteristic saline taste to the beverage which renders the beverage unpalatable to most consumers.

It is therefore an object of the present invention to provide a dry effervescent beverage composition capable of reconstitution in an aqueous beverage solution to provide a uniform evolution of small gas bubbles throughout the beverage liquid, thus achieving a significant visual effervescence of $CO_2$ as well as a high retention of effective carbonation in the form of soluble $CO_2$ while at the same time avoiding the production of any discernible salinty in the beverage product.

The present invention involves compounding a dry beverage composition to contain an edible carbonating agent which undergoes controlled hydrolysis in an excess of reconstituting aqueous liquid and the packaging of such composition in a substantially anhydrous atmosphere so as to avoid premature hydrolysis and degradation of carbonating agent in said composition.

In accordance with its more specific aspects, the invention involves selecting a carbonating agent which undergoes hydrolysis at a controlled rate during reconstitution of the dry beverage mix so that $CO_2$ is produced in a manner allowing the reconstituting liquid to absorb a higher percentage of soluble $CO_2$ than in the case of the relatively instant reacting "effervescent couple" of the prior art.

The present invention also involves as an essential feature thereof the selection of an organic carbonating agent and the incorporation of such agent into the dry beverage composition in a state wherein the readily hydrolyzable carbonating agent is uniformly and evenly dispersed throughout the reconstituting aqueous liquid in an incompletely reacted state to cause the individual unreacted moieties of the carbonating agent to undergo localized hydrolysis and thereby provide prolonged and uniform pinpoint evolution of $CO_2$ similar to the supersaturated $CO_2$ solutions of bottled beverages. Thus, in its more specific aspects the invention involves controlling the rate of reaction of the readily hydrolyzable carbonating agent so that it is available for prolonged reaction with the reconstituting aqueous liquid. Typically, this hydrolysis reaction will proceed at a controlled rate over a period of time in the neighborhood of 30 seconds to 3 minutes.

As distinguished from the process inherent in the "effervescent couple" referred to above which involves a neutralization of two interacting materials in the presence of water and the collateral production of $CO_2$, the mechanism of the present invention employs a carbonating agent which reacts directly with water without the addition of other rectants to release $CO_2$ on hydrolysis.

Preferably, the carbonating agents for use in the present invention may be selected from a class of organic compounds having the water-reactive carbonic acid anhydride grouping represented by the structural grouping

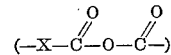

wherein X is an oxygen, nitrogen, or sulfur; said class of compounds being adapted to react with water at a predetermined controllable rate in accordance with the more specific aspects of this invention to release $CO_2$ and other desirable by-products which are soluble and edible in water solution.

More specifically, the structural grouping shown above will be present in a class of cyclic compounds which may be represented by the structural formulas:

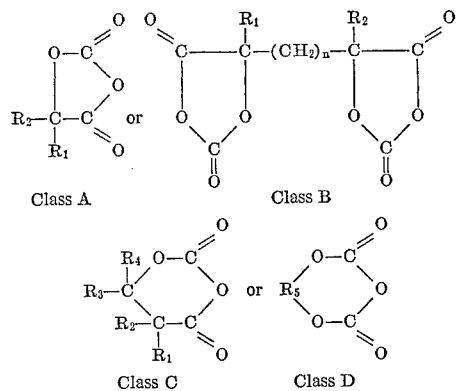

wherein $R_1$, $R_2$, $R_3$, $R_4$ and $R_5$ are hydrogen, an alkyl, an aralkyl, an aryl, a carboxyl, or an heterocyclic group and wherein $n=0$ or 1. In the case of $R_5$ the radical substituent may be a polyhydroxy derivative such as sorbitol, mannitol, glucose, etc.

The general formula for the water reactive carbonic acid anhydride grouping can be either cyclic or acyclic in structure. However, the indicated cyclic form is preferred since it is more reactive and more adapted to meet the desired specifications for an organic carbonating agent. For the preferred cyclic compounds, X in the above general formula will be O (oxygen) which permits the reaction of the compound at the desired rate while providing substantially complete hydrolysis within the period intended for use in meeting the effervescence criteria specified herein. On the other hand, other cyclic compounds wherein X represents N (nitrogen), e.g., N-carboxycyclic anhydride of glycine and other N - carboxy derivatives of alpha-amino acids like glycine, alanine, phenylalanine and glutamic acid, the reactivity is such that they do not offer a perferred hydrolysis rate capable of offering the effervescence required in an "instant type" dry beverage compound.

Among the acyclic compounds of use in accordance with the present invention are the linear dialkyl pyrocarbonates, e.g., butyl pyrocarbonate, propyl pyrocarbonate and the like. So far as is presently known these pyrocarbonates are only slowly reactive in a neutral or acidic medium such as called for in the compounding of a beverage composition. Hence in compounding a dry beverage composition adapted for reconstitution the pyrocarbonates will preferably be initially hydrolyzed in an alkaline medium to accelerate the hydrolysis incident to which an adjustment through the introduction of a suitable edible acidic compound such as one of the food acids, e.g., citric, tartaric or phosphoric will be made. This can be accomplished by locating the pyrocarbonate compound on the surface on a beverage matrix material, which material has located with respect to it a delayed availability of the said acidic material as by coating the materal with a fat, edible shellac or the like or even by enveloping the surface of the acidic material with a pyrocarbonate compound in a form such as a pill or tablet containing concentric layers outermost of which would be the pyrocarbonate and associated alkalizing materials.

Similarly, certain slower reactive cyclic compounds such as the cyclic pyrocarbonates and the N-carboxyanhydrides of the alpha-amino acids may be compounded in a beverage tablet and other composition which will provide first an alkaline medium and then an acidic medium.

Many of the above compounds such as the O-carboxyanhydrides of alpha-hydroxy acids like lactic acid, tartaric acid, or hydroxy glutaric acid will upon hydrolysis yield free acids. For many beverage formulations it will be desired to employ a buffer to modify tartness or sourness in accordance with the particular beverage flavor. Thus, in cola type beverages the pH will be adjusted to about 2.5, lemon, orange and general class of citrus flavors will be adjusted to a pH of 3.0 to 3.5 and relatively blander flavors like root-beer will call for a pH in the neighborhood of 5.0. Consequently, the particular beverage composition will call for variety levels of buffer in order to achieve the characteristic flavor and tartness and/or sourness of the end product. As will be discussed hereinafter, such buffers may be employed in a dual capacity where in addition to an adjustment of pH they react with the free acid as in the case of the inorganic carbonating agent of the prior art, e.g., the alkali and alkaline earth metal carbonates and bicarbonates. In this manner, one form of effervescence associated with the present invention may be combined with a second type of effervescence ("effervescent couple") as long as the "effervescent couple" reaction is kept at a low enough level which avoids salinity. In this latter connection, the degree of carbonation resulting from the "effervescent couple" reaction is such that the saline byproduct is below that which is discernible in the mouth.

Other water reactive anhydride compounds, more particularly those of Class D hereinabove, may be synthesized from nonacidic materials, such as various sugars like dextrose, xylose, galactose, glucose, arabinose and polysaccharides such as sucrose, lactose, maltose, cellobiose and polyols such as propylene glycol, glycerin, sorbitol, mannitol, etc. These sugars are represented by the substituent grouping $R_5$ of Class D. $R_5$ will be derived from a sugar or other polyhydroxy compound. In general, the nature of the compounds of Class D will be reactive products of an alkoxide-carbonate salt of a polyol compound and phosgene to yield a cyclic pyrocarbonic ester of the polyhydroxy material. Such members of the group Class D. will yield neutral water-soluble hydrolysis products. In such a case the flavor for the beverage composition desired will be suitably altered by the use of flavors and food acids.

The compounds in the above classes A, B and C are preferably made by dissolving and reacting an alpha- or beta-hydroxycarboxylic acid with an amount of phosgene (carbonyl dichloride) in a suitable solvent, said phosgene being present in an amount which is in excess of that required stoichiometrically. The reaction is allowed to proceed for a sufficient duration at a moderate temperature to produce a high yield of product. Finally, the reaction product is separated from the solvent and unreacted phosgene and may be further purified as discussed hereinafter.

In the case of the cyclic compounds of the alphahydroxy acids (shown in Class A and B), these compounds will vary in structure and properties with the particular acid reagent employed. For example, with lactic acid as the reagent the final compound may be represented by the structural formula:

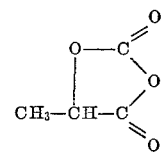

When a racemic mixture of lactic acid (D,L-optically inactive form) is used, the melting point of the resultant D,L-anhydro-O-carboxylactic acid is 28° C. However, when an optically active isomer of lactic acid, i.e., either the D(—) or the L(+) form is used, then the final compound will unexpectedly be found to have a melting point of 64° C. This latter compound is preferred from a processing and stability standpoint in making the dry mix beverage formulation. In this connection, reference may be had to British Patent No. 650,003 to W. H. Davies, published Feb. 7, 1951, which discloses one method of producing the low melting form of lactic acid derivative by using dioxane as the solvent for the alpha-hydroxy acid and phosgene. However, the method of Davies may be modified to obtain better yields of derivative as well as shorter reaction times whereas for certain derivatives, such as the bis-O-hydroxytartaric acid anhydride and bis-O-hydroxy glutaric acid anhydride a solvent such as tetrahydrofuran will have to be used in the synthesis as described in Feldman et al., U.S. Patent No. 3,218,338.

Among the O-carboxy acid anhydrides of the alphahydroxycarboxylic acids for use in this invention are the derivatives of such edible food acids as tartaric, hydroxyglutaric, lactic, malic, citric, etc., in their various stereoisomeric forms. Also a variety of other mono- and dibasic food acid derivatives may be employed.

As will be discussed hereinafter, this particular class of organic carbonating agents has a range of physical and chemical properties which call for an adjustment in the compounding techniques employed to provide a carbonating agent in a physical form adapted for controlled hydrolysis in accordance with the carbonation criteria of the present invention. For instance, the bis-O-carboxyanhydrides of tartaric and hydroxyglutaric acid, i.e., the L(+), D(—), meso, and D,L forms of the tartaric compound, have a high melting point in excess of 170° C. and are recoverable in a reactive crystalline state which allows the compound to be directly incorporated in the dry beverage composition in its crystalline particle form. However, these crystals should be provided in a uniform and discrete distribution in the beverage formulation in the form of solid crystals ranging in their average particle size from 1–100 microns. The crystals of tartaric acid derivative will preferably have a varied particle size distribution whereby some particles react relatively instantly to evolve all their $CO_2$ while a majority by weight of other particles react over a more prolonged period. For example, relatively large crystals of the compound, e.g., 30–100 microns, will continue to evolve a substantial portion of the available $CO_2$ over a period of 1–10 minutes while particles of less than 10 microns will release all their $CO_2$ in one minute.

A solid crystalline carbonating compound such as the aforesaid bis-O-carboxyanhydrides of tartaric and hydroxyglutaric acid will essentially be discretely and uniformly distributed throughout the dispersing solids of the beverage composition. The dispersing solids may take the form of a sweetening agent such as sucrose, dextrose or the like in powderous form or in the case of artificial sweetened beverages may be dispersed in inert bulking agents such as lactose, anhydrous dextines and other inert colloidally dispersible or water soluble agents such as sodium carboxymethyl cellulose, dextran, and like extenders. The beverage composition formulated containing the solid material may be in a powderous free-flowing form or in a tablet form. In either case the dispersing agent should be of a type which surrenders the carbonating agent upon reconstitution in a manner which promotes discrete and uniform distribution of the carbonating agent throughout the beverage liquid. Advantageously, in the case of a carbonating agent which is solid (as in the case of the aforesaid tartaric and hydroxyglutaric acid derivatives) such distribution can be readily effected due to the controlled particulation thereof and the consequent spacing of the rate of reaction of the particles due to their variance in particle size, e.g., some crystals being less than 10 microns (to provide immediate visual carbonation), some crystals being 10–30 microns (to provide carbonation over a period of 30 seconds to 3 minutes), and some crystals being 30–100 (to provide carbonation for as long as 10–15 minutes).

In selecting the granulation of the particular carbonating agent, care should be exercised to assure a discrete and uniform suspension thereof in the reconstituting liquid so that a minimum of settling to the bottom of the beverage or floating to its surface is experienced. The specific gravity of the reconstituted beverage should be so related to the granulation as well as the density of the carbonating agent that the latter is uniformly dispersed and maintained in suspension throughout the period of anticipated effervescence and consumption. Many of the coarser particles of the organic carbonating agent will settle to the bottom of the beverage initially during the start of hydrolysis, but as hydrolysis continues they will rise into the body of the liquid. However, the greater majority by weight of the carbonating agent will be dispersed throughout the beverage as it undergoes hydrolysis.

The various optical isomers of the bis-(anhydro-O-carboxy)tartaric acid compound and the bis-(anhydro-O-carboxy)hydroxyglutaric acid are to be distinguished from the low melting form of D,L-anhydro-O-carboxylactic acid (M.P. 28° C.) which can be considered somewhat slower reacting and therefore requiring the use of plating techniques which distribute the lactic acid derivative on the beverage formulaton ingredients, e.g., the sugar, or in the case of artificially sweetened beverages, on the bulking agent or filler material. The lactic acid derivative will be surface-coated on the sugar or other dispersing agent in as thin a film as possible. Of course, the lactic acid derivative must be plated in a substantially anhydrous atmosphere of less than 2% relative humidity to avoid the presence of even trace amounts of moisture.

The final formulation should be substantially anhydrous when it is compounded and packaged. Preferably, the final formulation should have a moisture content of less than 0.1% by weight water. Unlike the tartaric acid derivative, this compound will undergo autolytic degradation in the presence of only trace amounts of moisture and form insoluble polymers unless the compound is stored under anhydrous conditions at temperatures of below 5° C., preferably less than 0° C., to preserve the carbonating potential of the compound and its freedom from undesirable degradation products.

While in the case fo the higher melting forms of the lactic acid derivative (M.P. 64° C.), i.e., that formed from the reaction of either of the optically active isomers of lactic acid (L(+)-lactic acid or D(—)-lactic acid in the presence of phosgene, the compound will have an increased thermal stability due to its higher melting point, and due to its more reactive crystalline particle form may be used in a dry beverage mix in its crystalline form without the need for "plating" the compound.

In packaging the product at 75° F. the void space in the jar, envelope or other package should also be substantially anhydrous, that is, have less than 0.0040 gram of moisture per cubic milliliter of air. Since the functional carbonating agent of the present invention is dependent upon its ability to hydrolyze in water, care should be exercised not only in avoiding product moisture and relative humidity of the void space surrounding the product, but also the product should be packaged under conditions which minimize water vapor transmission since all three such factors contribute to degradation of the carbonating agent through reaction wtih water in vapor or other form. Therefore, it is within the confines of the invention also that the beverage composition may be packaged in a container employing an anhydrous chemical desiccating agent having a greater dehydrating potential than the carbonating agent, e.g., silica gel.

In the case of the slower reacting carbonating agents and those that react non-uniformly in water due to clumping and floating of unreacted compound, it has been found that the above "plating" procedure is quite helpful in improving the carbonating potential. However, regardless of whether the carbonating agent is "plated" or not, the dispersing solids for use in this invention must be edible, chemically inert to interaction with the carbonating agent, capable of being ground into a fine powder of large surface area which will serve as the carrying matrix for the organic carbonate, readily water-soluble, and have a density greater than water in the powderous form. The dispersing solids will have an average diameter particle size of 100–1000 microns. Also, in the case of liquefiable carbonating agents (those to be "plated"), a major proportion of solids in the dispersing solids must melt at a temperature above that of the liquefiable organic carbonating agent so that the organic carbonating agent may be effectively plated or coated on the powderous composition in as thin a film as possible without excessive penetration or absorption of the carbonate into the interior portions of the particles. Excessive penetration of the organic carbonate into the dispersing particles will tend to interfere with controlled hydration of the dry mix while causing the particles to clump during hydrolysis. Regardless of the method used by the procedures of this invention, the disadvantages of clumping and "gassing" of the hydrolyzing compound will be avoided and the organic carbonate will be uniformly distributed throughout the rehydrating liquid for a controlled reaction with water to give off $CO_2$ at a predetermined rate. This $CO_2$ evolution will take place as small bubbles which will slowly rise to the surface while allowing a substantial degree of $CO_2$ gas to be absorbed into liquid solution in the form of soluble $CO_2$.

In making a tableted form of the above ingredients, the coated solids and other beverage mix ingredients are combined with a suitable tablet disintegrator such as degraded, water-soluble starch material or other surface-active agents which will act upon contact with water to promote the rapid breakup of the tablet upon hydration. The tablet itself will be so shaped as to promote the maximum ratio of surface area to volume of composition whereby the water will more efficaciously serve to break up the tablet particles and hence contact of the organic carbonating agent with the liquid. In forming the tablet product it is essential to avoid conventional tableting techniques, such as wetting the blended ingredients prior to compressing the ingredients into tablet form. The dispersing matrix solids, as indicated previously, will serve in many applications, particularly in a powderous composition, as a sweetening agent; therefore a powdered sugar will preferably serve as the carrying matrix for the uniformly distributed organic carbonating agent.

In the case of the relatively rapid reacting organic carbonating agents, e.g., the bis(anhydro-O-carboxy)tartaric acid and the bis(anhydro - O - carboxy)hydroxyglutaric acid it will be desirable to decrease the reactivity of the compound in the presence of water. This may be done by decreasing the available surface area for reaction with water. This available area may be decreased by providing larger crystal particles, e.g., pelletizing the particle of the compound under pressure; precipitation or crystallization techniques which produce a relatively coarser granulation; or by plating the compound with a hydrophobic edible material, such as a fat (triglyceride). The reactivity of the bis(anhydro-O-carboxy)tartaric acid isomers is preferably prolonged by providing the derivative in a granulation wherein 90% by weight of the particles have a granulation of less than 100 microns and coarser than 10 microns. A minor proportion by weight of the crystals may be less than 10 microns to provide immediate effervescence on addition to water.

By observing the foregoing procedures, unsuitable carbonating effects of the organic carbonating agents are avoided. The various procedures employed help to avoid drastic loss in carbonating utility by minimizing large gas bubble formations which escape to atmosphere. Clumping and presence of unreacted floaters are also mitigated while the effercescence from the carbonating agent is uniformly and evenly distributed throughout the liquid beverage. In this manner, discrete pinpoint evolution of carbon dioxide gas bubbles result on hydrolysis of the compound to give a controlled and nonviolent effervescence of carbon dioxide in the beverage solution without the presence of any undesirable residue.

This invention will now be described more fully by reference to the following specific examples:

EXAMPLE I

| Ingredients | Grams | Percent | Grams | Percent |
| --- | --- | --- | --- | --- |
| Sugar | 26.7 | 89 | 25.2 | 84 |
| Anhydro-O-carboxylactic acid (M.P. 28° C.) | 2.4 | 8 | 3.0 | 10 |
| Sodium bicarbonate | 0.6 | 2 | | |
| Trisodium phosphate | | | 1.5 | 5 |
| Orange flavor and color | 0.3 | 1 | 0.3 | 1 |
| | 30.0 | 100 | 30.0 | 100 |

The carbonating agent for use in the above formulation is produced by reacting a racemic mixture of D,L-lactic acid with an excess amount of phsogene in the presence of ethyl ether as the solvent. The unreacted phsogene and solvent are removed by distillation and the crude reaction product is then purified with ethyl ether.

In the above formulation the color and sugar are blended in the presence of about 1% by weight of water until the sugar has completely absorbed all the flavor and color. The sugar is then vacuum dried to remove the water and the anhydrous sugar is then mixed with the low melting form of anhydro-O-carboxylactic acid (melting point 28° C.). The lactic acid derivative is then plated onto the sugar by blending the derivative with the sugar in an anhydrous atmosphere containing less than 2% relative humidity. The sugar has an average particle size of about 500 mesh. Coating of the sugar particles is achieved by raising the temperature of the mixture to above 28° C. during the blending operation. The mixture is then cooled to below 5° C. to fuse the lactic acid derivative onto the surface of the sugar particles in a thin coating. Sodium bicarbonate having an average particle size of 100–500 microns or trisodium phosphate buffer having a particle size of about 200 mesh is then added to the dry beverage mix. The mix is packaged in screw-cap jars which are then stored at refrigerator temperatures of 5° C. The final beverage formulation has less than 0.1% of water present.

The above dry beverage mix (30 grams) may then be stirred into a 6 ounce beverage glass containing about 180 ml. of cold water (5° C.). Stirring is continued for about 30–60 seconds to completely dissolve the beverage ingredients. The resulting beverage solution exhibits effervescence for about one minute and will continue to evolve small bubbles of $CO_2$ after 3–5 minutes. The beverage mix evolves about 2 volumes of $CO_2$ per volume of water and about 1.5 of this carbon dioxide is retained in the form of soluble carbon dioxide. Visual carbonation is present for 1–10 minutes and within this period a characteristic carbonation bite may be experienced on drinking of the beverage solution. There is no trace of salinity discernible on drinking the beverage.

EXAMPLE II

The procedure of Example I is followed with the exception that the high melting form of anhydro-O-carboxylactic acid (melting point 64° C.) is used as the carbonating agent. The high melting form of lactic acid derivative is produced by reacting optically active L(+) or D(−)-lactic acid with an excess of phosgene in the presence of ethyl ether as the solvent medium. The high melting lactic derivative is plated onto the sugar particles in an anhydrous atmosphere according to the procedure of Example I, with the exception that the mixture is heated to a higher temperature, i.e., above 64° C.

The beverage mix when stirred into 180 ml. of cold water will give a nonsaline carbonated beverage similar to that of Example I.

EXAMPLE III

| Ingredients | Grams | Percent | Grams | Percent |
| --- | --- | --- | --- | --- |
| Sugar | 34.10 | 93.2 | 34.10 | 87.3 |
| L(+)-bis(anhydro-O-carboxy)tartaric acid | 1.68 | 4.5 | 2.18 | 5.3 |
| Sodium bicarbonate | 0.48 | 1.3 | | |
| Trisodium phosphate | | | 2.50 | 6.5 |
| Starch | 0.30 | 0.8 | 0.31 | 0.7 |
| Flavor and color | 0.007 | 0.2 | 0.007 | 0.2 |
| Dry beverage mix | 36.57 | 100 | 39.09 | 100 |

The L(+)-bis(anhydro-O-carboxy)tartaric acid is produced by the procedure disclosed in patent application of J. R. Feldman et al., Ser. No. 452,332, filed Apr. 30, 1965, entitled "Organic Carbonating Agent," now U.S. Patent No. 3,309,382, using tetrahydrofuran as the solvent medium. The crystals of tartaric acid derivative are then screened to attain an average particle size distribution wherein 10% of the crystals are 1–10 microns, 70% are 10–30 microns, and 20% are 30–100 microns. The crystals are then thoroughly blended with the sugar having a mesh size of 500 microns and the remaining ingredients, all of which have an average particle size of less than 300 microns, under substantially anhydrous conditions of less than 2% relative humidity (nitrogen atmosphere). The beverage formulation is then packaged in screw-cap jars which assure a moisture level of less than 0.5% in the dry beverage mix formulation. These small jars are then stored at 43° C. (100° F.). Regardless of the length or period of storage, when about 36 grams of each of the sample formulation are stirred into 180 ml. of cold water (5° C.), the samples will be found to release about 2.2 volumes of carbon dioxide per volume of water. The beverage mix produces some slight visual effervescence immediately on contact with water and after 30 seconds begins to effervesce at a rapid rate of 1–3 minutes followed by a slower rate of $CO_2$ evolution between 3 to 10 minutes. Within this time period small bubbles of carbon dioxide will permeate the beverage solution and slowly rise to the surface to give the effect of visual carbonation. After 3 minutes the beverage solution is completely devoid of any floaters or unslightly residue due to unreacted material. The beverage solution gives no discernible salinity on drinking and retains about 1.5 volumes of soluble $CO_2$. At room temperature a carbonation bite is experienced for as long as 30–45 minutes.

EXAMPLE IV

| Ingredients | Grams | Percent |
| --- | --- | --- |
| Sugar | 24.0 | 80 |
| N-carboxycyclic anhydride of glycine | 3.0 | 10 |
| Protein hydrolyzate | 3.0 | 10 |
| Sodium Citrate | 0.2 | |
| Root-Beer flavor and color | 0.1 | |
| | 30.3 | 100 |

The N-carboxyanhydride is plated onto the sugar by forming a solution of the cyclic anhydride of glycine in 20 ml. of ethyl acetate, filtering the solution, adding sugar to the solution and then allowing the ethyl acetate to evaporate. The anhydride is uniformly plated onto the sugar particles as the ethyl acetate evaporates. The protein hydrolyzate, root-beer ingredients, and sodium citrate are then mixed with the plated sugar particles in an anhydrous atmosphere and then stored at 0° C. About 30 grams of dry mix are then stirred into 180 ml. of cold water (5° C.). The resultant beverage solution is quite clear while experiencing a distinct carbonation evidenced by the presence of small $CO_2$ bubbles which slowly rise to the surface of the beverage. The N-carboxy cyclic anhydride of glycine releases about 2.3 volumes of $CO_2$ of which 1.5 volumes is retained. Carbonation lasts for well over 15 minutes during which time a carbonation sensation with no evidence of salinity is experienced.

EXAMPLE V

| Ingredients | Grams | Percent |
| --- | --- | --- |
| Sugar | 34.1 | 93.0 |
| Bis[5,5'-(1,3-dioxolane-2,4 dione)]methane | 1.78 | 4.85 |
| Sodium bicarbonate | 0.48 | 1.31 |
| Starch | 0.3 | 0.82 |
| Flavor and color | 0.007 | 0.02 |
| | 36.67 | 100.00 |

The bis(anhydro-O-carboxy) hydroxy glutaric acid is produced by the procedure disclosed in patent application of J. R. Feldman et al., Ser. No. 452,332, filed Apr. 30, 1965, entitled "Organic Carbonating Agent," now U.S. Patent No. 3,309,382, using tetrahydrofuran as the solvent medium. The crystals of hydroxyglutaric acid derivative are then screened to attain an average particle size distribution wherein 10% of the crystals are 1–10 microns, 70% are 10–30 microns, and 20% are 30–100 microns. The crystals are then thoroughly blended with the sugar having a mesh size of 500 and the remaining ingredients, all of which have an average particle size of less than 300 microns, under substantially anhydrous conditions of less than 2% relative humidity (nitrogen atmosphere). The beverage formulation is then packaged in screw-cap jars which assure a moisture level of less than 0.5% in the final beverage formulation. These small jars are then stored at 43° C. (110° F). Regardless of the length or period of storage, when about 36 grams of each of the sample formulations are stirred into 180 ml. of cold water (5° C.), the samples will be found to release about 2.2 volumes of carbon dioxide per volume of water. The beverage mix produces some slight visual effervescence immediately on contact with water and after 30 seconds begins to effervesce at a rapid rate for 1–3 minutes followed by a slower rate of $CO_2$ evolution between 3 to 10 minutes. Within this time period small bubbles of carbon dioxide will permeate the beverage solution and slowly rise to the surface to give the effect of visual carbonation. After 3 minutes the beverage solution is completely devoid of any floaters or unsightly residue due to unreacted material. The beverage solution gives no discernible salinity on drinking and retains about 1.5 volumes of soluble $CO_2$. At room temperature a carbonation bite in the beverage solution is experienced for as long as 30–45 minutes.

While this invention has been described by reference to several specific examples, it is to be restricted only by the scope of the following claims.

What is claimed is:

1. A dry beverage composition adapted to be reconstituted with an aqueous liquid to an effervescent beverage comprising as an essential carbonating ingredient thereof an organic compound having a carbonic acid anhydride group capable of hydrolysis in an excess of water to release $CO_2$ and edible water-soluble byproducts, said agent being uniformly and discretely distributed throughout the dry beverage composition in a condition wherein the carbonating agent is adapted to be uniformly dispersed throughout the reconstituting aqueous liquid in an incompletely reacted condition to cause individual unreacted moieties of the carbonating agent to undergo localized hydrolysis in said aqueous liquid, said carbonating agent being adapted to undergo said hydrolysis at a rate wherein a major proportion of the $CO_2$ produced is retained as soluble $CO_2$ and for a period sufficiently prolonged to evolve gaseous $CO_2$ at least 30 seconds to 3 minutes after admixture of the beverage composition to said water excess, and said composition being compounded and packaged under substantially anhydrous conditions.

2. The composition of claim 1 including a buffer, said buffer giving a desired beverage solution pH of about 2.5–5 on reconstitution.

3. A dry beverage composition according to claim 1 wherein the organic compound which gives carbonation is capable of reaction in its crystalline form at a sufficient rate to provide carbonation of a beverage within 3 minutes, and wherein said organic compound is present in said composition in a crystal particle size distribution which hydrolyzes at a predetermined rate providing high retention of soluble $CO_2$ and visual effervescence over a period of at least 30 seconds to 3 minutes.

4. A dry beverage composition according to claim 1 wherein the organic compound is distributed in the form of a coating on the composition to provide carbonation at a predetermined rate which gives a high retention of soluble $CO_2$ and visual effervescence for a period of at least 30 seconds to 3 minutes.

5. The composition of claim 1 wherein the carbonating agent is the O-carboxy anhydride of an edible hydroxy acid and a buffer is included to give a selected beverage solution pH of reconstitution.

6. The composition of claim 1 wherein the carbonating agent is an O-carboxyanhydride of an alpha-hydroxy acid and a buffer is included to give a selected beverage solution pH on reconstitution.

7. The composition of claim 3 wherein the carbonating agent which is present in its crystalline form is taken from the group consisting of bis(anhydro-O-carboxyl)tartaric acid, bis(anhydro-O-carboxy)hydroxyglutaric acid and the high melting isomers of anhydro-O-carboxylactic acid.

8. The composition of claim 4 wherein the carbonating agent is selected from the group consisting of the low melting isomers of anhydro-O-carboxylactic acid, cyclic pyrocarbonates, acyclic pyrocarbonates, and N-carboxyanhydrides of alpha-amino acids.

9. A dry beverage composition adapted to be reconstituted with an aqueous liquid to an effervescent beverage comprising as an essential carbonating agent thereof an organic compound having a carbonic acid anhydride group and an inorganic carbonate salt; said organic compound being capable of hydrolysis in an excess of water to release $CO_2$ and an edible food acid, said organic compound being present in an amount which produces a beverage pH below that of optimal beverage flavor for the reconstituted composition, said organic compound being distributed in the dry beverage composition in a physical state wherein it will undergo hydrolysis at a rate which allows a major proportion of the $CO_2$ produced to be retained as soluble $CO_2$ while said hydrolysis is sufficiently prolonged to evolve gaseous $CO_2$ over a period of at least about 30 seconds to 3 minutes after admixture of the beverage composition with the water excess; said inorganic carbonate salt being present at a level which upon reconstitution causes substantial reaction with said food acid to reduce the acidity of the beverage solution to that required for optimal flavor and to produce added $CO_2$ during said period of reconstitution; and said composition being compounded and packaged under substantially anhydrous conditions.

10. The composition of claim 9 wherein the inorganic carbonate salt is selected from the group consisting of an alkali metal carbonate, an alkali metal bicarbonate, an alkaline earth metal bicarbonate, and an alkaline earth metal carbonate.

11. The composition of claim 10 wherein the organic compound is an O-carboxyanhydride of an alpha-hydroxy acid which will provide a suitable acidic tartness in a water solution having a pH of about 2.5–5.

12. The composition of claim 11 wherein the organic compound is distributed in a coating over dispersible beverage ingredients to provide carbonation at a predetermined rate.

13. The composition of claim 11 wherein the organic compound is present in the beverage composition in the form of a crystalline material which is substantially solid at ambient temperatures and has a varied particle size distribution to provide carbonation over a period of at least 30 seconds to 3 minutes.

14. The composition of claim 11 wherein the O-carboxyanhydride is the low melting isomers of anhydro-O-carboxylactic acid.

15. The composition of claim 12 wherein the O-carboxylanhydride is selected from the group consisting of bis(anhydro-O-carboxy)tartaric acid, bis(anhydro-O-carboxy)hydroxy glutaric acid and the high melting isomers of anhydro-O-carboxylactic acid.

16. The composition of claim 15 wherein the O-carboxyanhydride is bis(anhydro-O-carboxy)hydroxyglutaric acid and said anhydride crystals are present in a varied particle size distribution wherein 90% by weight of the particles have a granulation of less than 100 microns and 10% by weight of the particles are greater than 10 microns.

17. The process of making a dry effervescent beverage composition which comprises blending an organic carbonating agent having a carbonic acid anhydride group with beverage ingredients to uniformly distribute said agent over said ingredients in a condition whereat the organic carbonating agent is adapted to be uniformly dispersed throughout the reconstituting liquid in an incompletely reacted condition which will undergo hydrolysis at a rate wherein a major proportion of the $CO_2$ produced is retained as soluble $CO_2$ and wherein said rate is sufficiently prolonged to evolve gaseous $CO_2$ over a period of at least 30 seconds to 3 minutes after admixture of the beverage composition to said water excess, and packaging said composition under substantially anhydrous conditions.

18. The process of claim 17 wherein the organic carbonating agent is uniformly distributed in the beverage ingredients in a condition adapted to hydrolyze at a predetermined rate by coating said carbonating agent on dispersible beverage ingredients.

19. The process of claim 17 wherein the organic carbonating agent is uniformly distributed in the beverage ingredients in a crystalline particle form, said crystalline particles being provided in a varied particle size distribution wherein $CO_2$ evolution is provided at a predetermined rate.

References Cited

UNITED STATES PATENTS

| | | | |
|---|---|---|---|
| 2,463,962 | 3/1949 | Gorsica | 99—79 |
| 2,603,569 | 7/1952 | Alther et al. | 99—78 |
| 2,776,892 | 1/1957 | Sandri | 99—79 |
| 2,910,400 | 10/1959 | Bernhard et al. | 99—150 X |
| 2,984,543 | 5/1961 | Smith | 99—78 X |

OTHER REFERENCES

Chemical Abstracts, vol. 46, 1952, pp. 1977h to 1978c.

MAURICE W. GREENSTEIN, *Primary Examiner.*

U.S. Cl. X.R.

99—28, 78, 199